(12) United States Patent
Arini et al.

(10) Patent No.: US 8,843,584 B2
(45) Date of Patent: Sep. 23, 2014

(54) METHODS FOR DISPLAYING CONTENT ON A SECOND DEVICE THAT IS RELATED TO THE CONTENT PLAYING ON A FIRST DEVICE

(75) Inventors: Nick Arini, Botley (GB); Debbie O'Sullivan, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/174,612

(22) Filed: Jun. 30, 2011

(65) Prior Publication Data

US 2012/0311074 A1    Dec. 6, 2012

Related U.S. Application Data

(60) Provisional application No. 61/492,745, filed on Jun. 2, 2011.

(51) Int. Cl.

| | | |
|---|---|---|
| G06F 15/16 | (2006.01) | |
| H04N 21/858 | (2011.01) | |
| H04N 21/4788 | (2011.01) | |
| H04N 21/81 | (2011.01) | |
| H04N 21/258 | (2011.01) | |
| H04N 21/231 | (2011.01) | |
| H04N 21/8358 | (2011.01) | |

(52) U.S. Cl.
CPC ....... *H04N 21/23109* (2013.01); *H04N 21/858* (2013.01); *H04N 21/4788* (2013.01); *H04N 21/8126* (2013.01); *H04N 21/258* (2013.01); *H04N 21/8358* (2013.01); *H04N 21/25883* (2013.01)
USPC .......................................................... 709/217

(58) Field of Classification Search
None
See application file for complete search history.

(56) References Cited

U.S. PATENT DOCUMENTS

| | | | |
|---|---|---|---|
| 6,993,575 B2 * | 1/2006 | Abkowitz et al. | 709/220 |
| RE42,103 E | 2/2011 | Palmer | |
| 8,230,458 B2 * | 7/2012 | Amento et al. | 725/13 |
| 2008/0066126 A1 | 3/2008 | Walter et al. | |
| 2009/0007216 A1 | 1/2009 | Ku et al. | |
| 2009/0113472 A1 | 4/2009 | Sheth et al. | |
| 2010/0185730 A1 * | 7/2010 | Sebastian | 709/204 |
| 2010/0202761 A1 | 8/2010 | Bhogal et al. | |
| 2011/0137976 A1 * | 6/2011 | Poniatowski et al. | 709/203 |
| 2011/0184862 A1 * | 7/2011 | Lanier et al. | 705/40 |
| 2011/0185036 A1 * | 7/2011 | Lanier et al. | 709/217 |
| 2014/0032635 A1 * | 1/2014 | Pimmel et al. | 709/203 |

OTHER PUBLICATIONS

Google Inc., International Search Report and Written Opinion, PCT/US2012/039872, Jan. 3, 2013, 8 pgs.
Google Inc., International Preliminary Report on Patentability, PCT/US2012/039872, Dec. 12, 2013, 7 pgs.

* cited by examiner

*Primary Examiner* — Brian P Whipple
(74) *Attorney, Agent, or Firm* — Morgan, Lewis & Bockius LLP

(57) ABSTRACT

Content information is received from a first client. The content information is derived from a video stream being played on the first client device. The content information is matched to a content fingerprint. A set of instructions associated with the matched content fingerprint is determined. The determined set of instructions is sent to a second client device that is associated with a user of the fist client device for execution.

18 Claims, 13 Drawing Sheets

700 ⟶

Client 140

702 — A set of instructions is received. The set of instructions include instructions to display content that is related to content playing on a first client device.

704 — The set of instructions include instructions to retrieve one or more content files from a server remotely located from the second client.

706 — One or more content files are retrieved from the server remotely located from the client. The one or more content files include content related to the content playing on the first client device.

708 — One or more applications are executed in accordance with the set of instructions. The one or more applications display the related content.

710 — The set of instructions includes instructions to execute one or more applications selected from the group consisting of a music application, a feed reader application, a coupon application, a web browser application, an advertisement application and a custom application.

712 — Displaying information from the one or more content files.

FIGURE 7

METHODS FOR DISPLAYING CONTENT ON A SECOND DEVICE THAT IS RELATED TO THE CONTENT PLAYING ON A FIRST DEVICE

RELATED APPLICATIONS

This application claims priority to U.S. Provisional Application Ser. No. 61/492,745, filed Jun. 2, 2011, entitled "Methods for Displaying Content on a Second Device that is Related to the Content Playing on a First Device", which is incorporated by reference herein in its entirety.

TECHNICAL FIELD

The present application describes systems and methods for presenting on a second device information that is s related to media content being presented on a first device.

BACKGROUND

Video content sometimes includes audio messages and visual messages that prompt viewers to obtain information relating to the video content. For example, a television commercial may prompt a user to visit a product's website associated with an advertised product to obtain coupons or information about the product. In another example, during the broadcast of a television program or movie, a message may appear prompting a viewer to visit a website to view more information about the people, places or things depicted in or associated with the television program or movie. Even without being prompted to, many users are interested in a person, place or thing related to the video content they are watching. Typically, to obtain information relevant to a video stream, a user would need to visit a website using an Internet-enabled device. Existing methods for providing users with information related to content they are viewing are inefficient because they require users to take some action that is outside the viewing experience. Also many viewers may miss or ignore audio messages and visual messages that provide additional information about video content, and it may be inconvenient for many viewers to operate a computing device while viewing video content.

SUMMARY

The above deficiencies and other problems are reduced or eliminated by the disclosed methods and devices. The methods and systems described herein disclose systems and methods for displaying content on a second client device that is related to content playing on a first client device. Such methods and systems provide an effective way for broadcasters and content providers to provide relevant information to users who are watching video content. While a video stream is playing on a first client device, the first client device sends content information derived from the video stream to a server system. The server system identifies the video stream playing on the first client device by matching the content information to a content fingerprint. The server system then generates a set of instructions and identifies content based on the matched content fingerprint. The set of instructions includes instructions to display content related to the content of the video stream displayed on the first client device. The set of instructions is sent to the second client device for execution and the related content is sent to the second client device for display.

The second client device executes one or more applications in accordance with the set of instructions and displays the related content.

In accordance with some implementations, systems and methods are provided to display content on a second client device that is related to a video stream playing on a first client device. Content information is received from a first client at a server system. The content information is derived from a video stream playing on the first client device. The content information is matched to a content fingerprint. A set of instructions is determined based on the content fingerprint and the set of instructions is sent to a second client device that is associated with a user of the first client device for execution.

In accordance with some implementations, a set of instructions is received at a second client device. The set of instructions include instructions to display information related to content playing on a first client device. One or more applications are executed in accordance with the set of instructions. The one or more applications display the information related to the content playing on the first client device.

BRIEF DESCRIPTION OF THE DRAWINGS

FIG. 7 is a flowchart illustrating the process of displaying information on a second client device that is related to content playing on a first client device.

Like reference numerals refer to corresponding parts throughout the drawings.

DESCRIPTION OF IMPLEMENTATIONS

The methods and systems described herein disclose systems and methods for displaying content on a second client device that is related to content playing on a first client device. Such methods and systems provide an effective way for broadcasters and content providers to provide relevant information to users who are watching video content.

Figure 1:
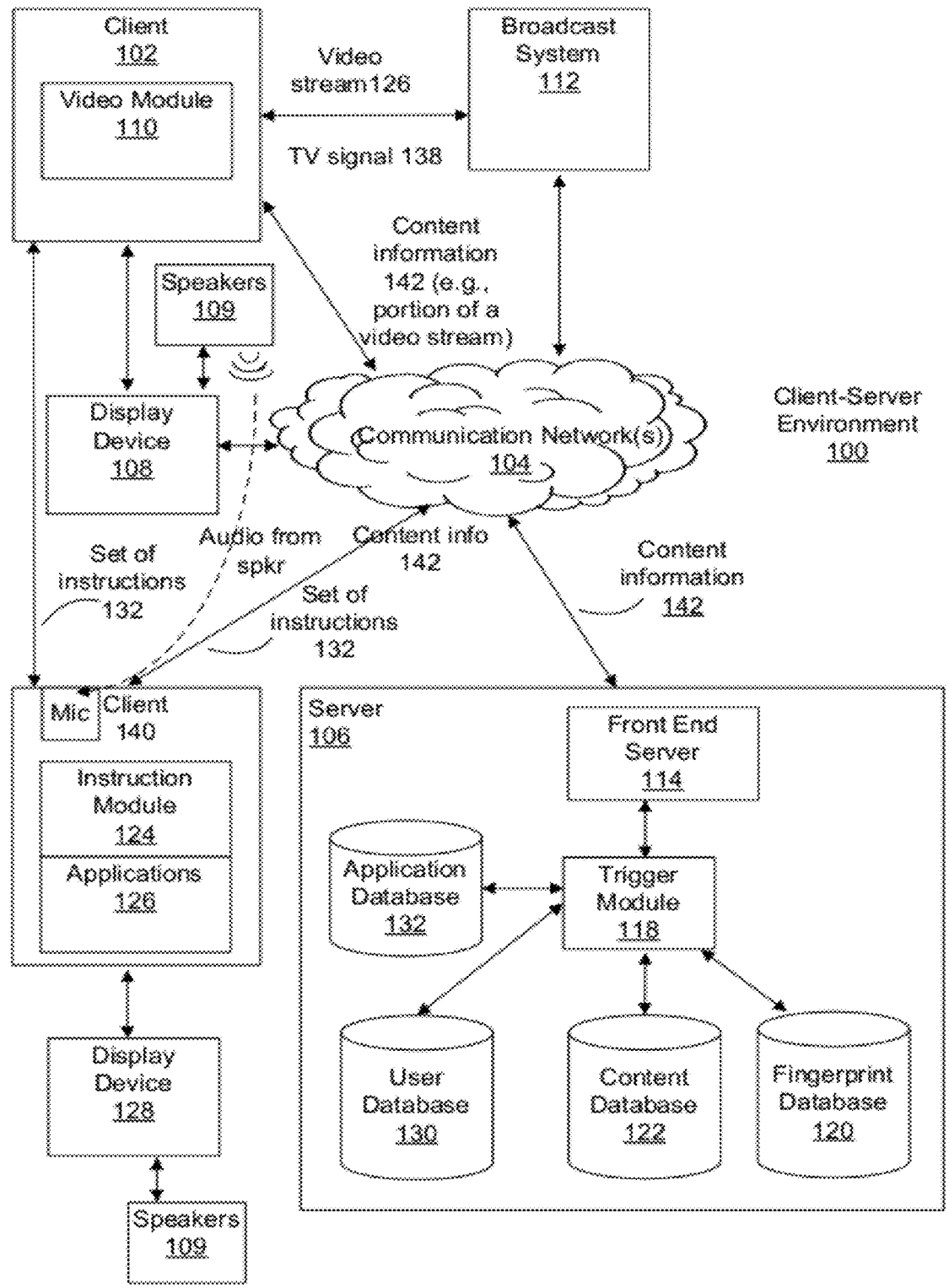
FIG. 1 is a block diagram illustrating a distributed client-server system in accordance with some implementations.

FIG. 1 is a block diagram illustrating a distributed system 100 that includes: a client device 102, a client device 140, a communication network 104, a server system 106, a digital display 110 and a broadcast system 112. The server system 106 is coupled to the client device 102, the client device 140 and the broadcast system 112 by the communication network 104.

The functionality of the broadcast system 112 and the server system 106 can be combined into a single server system. In some implementations, the server system 106 is implemented as a single server system, while in other implementations it is implemented as a distributed system of multiple servers. Solely for convenience of explanation, the server system 106 is described below as being implemented on a single server system. In some implementations, the broadcast system 112 is implemented as a single server system, while in other implementations it is implemented as a distributed system of multiple servers. Solely, for convenience of explanation, the broadcast system 108 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the client devices 102 and 140 and the server system 106. In some implementations, the communication network 104 uses the HyperText Transport Protocol (HTTP) to transport information using the Transmission Control Protocol/Internet Protocol (TCP/IP). HTTP permits client devices 102 and 140 to access various resources available via the communication network 104. The various implementations described herein, however, are not limited to the use of any particular protocol.

In some implementations, the server system 106 includes a front end server 114 that facilitates communication between the server system 106 and the network 104. The front end server 114 receives content information 142 from the client 102 and/or the client 140. In some implementations, the content information 142 is a video stream or a portion thereof. In some implementations, the content information 142 is derived from a video stream playing on the client 102 (such as a portion of a video stream playing on the client 102 and one or more fingerprints of that portion). In some implementations, the front end server 114 is configured to send a set of instructions to a client device 140. In some implementations, the front end server 114 is configured to send content files and/or links to content files. In this context, the term "content file" means any document or content of any format including, but not limited to, a video file, an image file, a music file, a web page, an email message, an SMS message, a content feed, an advertisement, a coupon, a playlist or an XML document. In some implementations, the front end server 114 is configured to send or receive one or more video streams.

According to some implementations, a video or video stream is a sequence of images or frames representing scenes in motion. A video should be distinguished from an image. A video displays a number of images or frames per second. For example, a video displays 30 consecutive frames per second. In contrast, an image is not associated with any other images.

A content feed (or channel) is a resource or service that provides a list of content items that are present, recently added, or recently updated at a feed source. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional meta data that provides additional information about the content. The full version of the content may be any machine-readable data, including but not limited to web pages, images, digital audio, digital video, Portable Document Format (PDF) documents, and so forth.

In some implementations, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other implementations, other content syndication formats, such as the Atom syndication format or the VCALENDAR calendar format, may be used to specify content feeds.

In some implementations, the server system 106 includes a user database 130 that stores user data. In some implementations, the user database 130 is a distributed database.

In some implementations, the server system 106 includes a content database 122. In some implementations, the content database 122 includes advertisements, videos, images, music, web pages, email messages, SMS messages, content feeds, advertisements, coupons, playlists, XML documents or any combination thereof. In some implementations, the content database 122 includes links to advertisements, videos, images, music, web pages, email messages, SMS messages, content feeds, advertisements, coupons, playlists, and XML documents. In some implementations, the content database 122 is a distributed database.

In some implementations, the server system 106 includes a trigger module 118 that includes modules to receive content information 142 from the client 102 and/or the client 140, match the content information to a content fingerprint in the fingerprint database 120, determine a set of instructions 132 based on the matched fingerprint and send the set of instructions 132 to the client 140 for execution.

In some implementations, the server system 106 includes a fingerprint database 120 that stores content fingerprints. As used herein, a content fingerprint is any type of condensed or compact representation, or signature, of the content of a video stream and/or audio stream. In some implementations, a fingerprint may represent a clip (such as several seconds, minutes, or hours) of a video stream or audio stream. Or, a fingerprint may represent a single instant of a video stream or audio stream (e.g., a fingerprint of single frame of a video or of the audio associated with that frame of video). Furthermore, since video content changes over time, corresponding fingerprints of that video content will also change over time. In some implementations, the fingerprint database 120 is a distributed database.

In some implementations, the server system 106 includes an application database 132 that stores applications. In some implementations, the application database 132 is a distributed database.

The client device 102 includes a video module 110 that receives video streams 126 from the broadcast system 112, extracts content information 142 from a video stream 126 that is playing on the client 102 and sends the content information 142 to the server 106.

The client device 102 is any suitable computer device that in some implementations is capable of connecting to the communication network 104, receiving video streams, extracting information from video streams and presenting video streams on the display device 108. In some implementations, the client device 102 is a set top box that includes components to receive and present video streams. For example, the client device 102 can be a set top box for receiving cable TV and/or satellite TV, a digital video recorder (DVR), a digital media receiver, a TV tuner, a computer, and/or any other device that outputs TV signals. In some implementations, the client device 102 displays a video stream on the display device 108. In some implementations the client device 102 can be a conventional TV display that is not connected to the Internet and that displays digital and/or analog TV content via over the air broadcasts or a satellite or cable connection.

In some implementations, the display device 108 can be any display for presenting video content to a user. In some implementations, the display device 108 is the display of a television, or a computer monitor, that is configured to receive and display audio and video signals or other digital content from the client 102. In some implementations, the display device 108 is an electronic device with a central processing unit, memory and a display that is configured to receive and display audio and video signals or other digital content form the client 102. For example, the display device can be a LCD screen, a tablet device, a mobile telephone, a projector, or other type of video display system. The display 108 can be coupled to the client 102 via a wireless or wired connection.

In some implementations, the client device 102 receives video streams 126 via a TV signal 138. As used herein, a TV signal is an electrical, optical, or other type of data transmitting medium that includes audio and/or video components corresponding to a TV channel. In some implementations, the TV signal 138 is a terrestrial over-the-air TV broadcast signal or a sign distributed/broadcast on a cable-system or a satellite system. In some implementations, the TV signal 138 is transmitted as data over a network connection. For example, the client device 102 can receive video streams from an Internet connection. Audio and video components of a TV signal are sometimes referred to herein as audio signals and video signals. In some implementations, a TV signal corresponds to a TV channel that is being displayed on the display device 108.

In some implementations, a TV signal carries information for audible sound corresponding to an audio track on a TV channel. In some implementations, the audible sound is produced by speakers associated with the display device 108.

The client device 140 may be any suitable computer device that is capable of connecting to the communication network 104, such as a computer, a laptop computer, a tablet device, a netbook, an internet kiosk, a personal digital assistant, a mobile phone, a gaming device, or any other device that is capable of communicating with the server system 106. The client device 140 typically includes one or more processors, non-volatile memory such as a hard disk drive and a display. The client device 140 may also have input devices such as a keyboard and a mouse (as shown in FIG. 3). In some implementations, the client device 140 includes touch screen displays.

In some implementations, the client device 140 is connected to a display device 128. The display device 128 can be any display for presenting video content to a user. In some implementations, the display device 128 is the display of a television, or a computer monitor, that is configured to receive and display audio and video signals or other digital content from the client 128. In some implementations, the display device 128 is an electronic device with a central processing unit, memory and a display that is configured to receive and display audio and video signals or other digital content from the client 140. In some implementations, the display device 128 is a LCD screen, a tablet device, a mobile telephone, a projector, or any other type of video display system. In some implementations, the client device 140 is connected to the display device 128. In some implementations, the display device 128 includes, or is otherwise connected to, speakers capable of producing an audible stream corresponding to the audio component of a TV signal or video stream.

In some implementations, the client device 140 is connected to the client device 102 via a wireless or wired connection 103. In some implementations where such connection exists, the client device 140 optionally operates in accordance with instructions, information and/or digital content (collectively second screen information 105) provided by the client device 102. In some implementations, the client device 102 issues instructions to the client device 140 that cause the client device 140 to present on the display 128 and/or the speaker 129 digital content that is complementary, or related to, digital content that is being presented by the client 102 on the display 108.

In some implementations, the client device 140 includes a microphone that enables the client device to receive sound (audio content) from the client 102 as the client 102 plays the video content 126. The microphone enables the client device 102 to store the audio content/soundtrack that is associated with the video content 126 as it is played/viewed. In the same manner as described herein for the client 102, the client device 140 can store this information locally and then send to the server 106 content information 142 that is any one or more of: fingerprints of the stored audio content, the audio content itself, portions/snippets of the audio content, or fingerprints of the portions of the audio content. In this way, the server 106 can detect triggers from the content information 142 sent by the client device 140 even if the electronic device on which the content is being displayed/viewed is not an Internet-enabled device, such as an older TV set; is not connected to the Internet (temporarily or permanently) so is unable to send the content information 142; or does not have the capability to record or fingerprint media information related to the video content 126. Such an arrangement (i.e., where the second screen device 140 stores and sends the content information 142 to the server 106) allows a user to receive from the server 106 second screen content triggered in response to the content information 142 no matter where the viewer is watching TV.

In some implementations, the client device 140 includes an instruction module 124 and one or more applications 126. As discussed in greater detail herein, the instruction module 124 executes one or more applications in accordance with a set of instructions 132 received from the server 106.

Figure 2A:
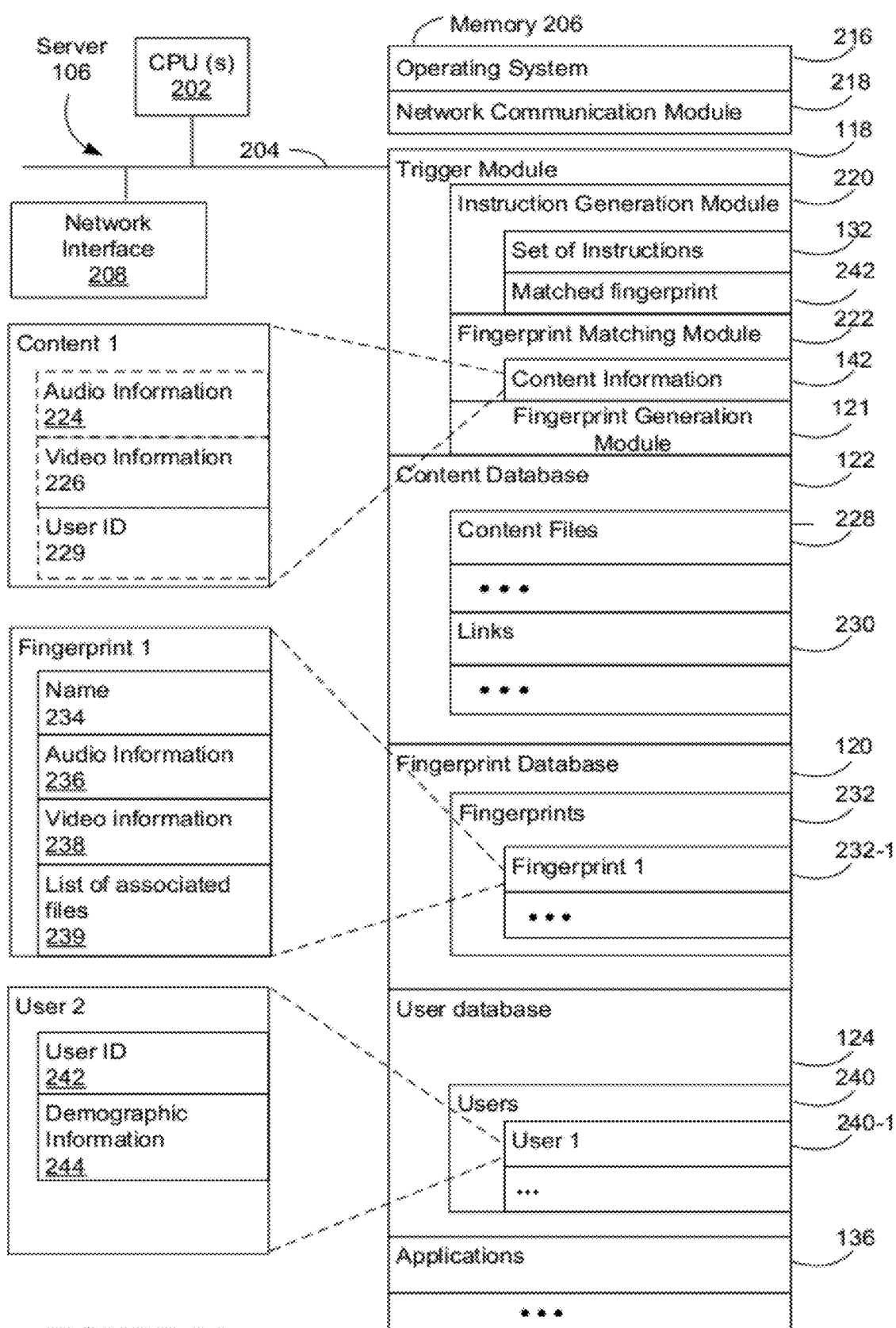
FIG. 2A is a block diagram illustrating the structure of an exemplary server system according to some implementations.

FIG. 2A is a block diagram illustrating a server system 106, in accordance with some implementations. The server system 106 typically includes one or more processing units (CPU's) 202, one or more network or other communications interfaces 208, memory 206, and one or more communication buses 204 for interconnecting these components. The communication buses 204 optionally include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium. In some implementations, memory 206 or the non-transitory computer readable storage medium of memory 206 stores the following programs, modules and data structures, or a subset thereof including an operation system 216, a network communication module 218, a trigger module 118, a content database 122, a fingerprint database 120, a user database 124, and applications 136.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The content database 122 includes content files 228 and/or links to content files 230. In some implementations, the content database 122 stores advertisements, videos, images, music, web pages, email messages, SMS messages, a content feeds, advertisements, coupons, playlists, XML documents and any combination thereof. In some implementations, the content database 122 includes links to advertisements, videos, images, music, web pages, email messages, SMS messages, content feeds, advertisements, coupons, playlists, XML documents and any combination thereof. Content files 228 are discussed in more detail in the discussion of FIG. 2B.

The user database 124 includes user data 240 for one or more users. In some implementations, the user data for a respective user 240-1 includes a user identifier 242 and demographic information 244. The user identifier 242 identifies a user. For example, the user identifier 242 can be an IP address associated with a client device 102 or an alphanumeric value chosen by the user or assigned by the server that uniquely identifies the user. The demographic information 244 includes the characteristics of the respective user. The demographic information may include may be one or more of the group consisting of age, gender, income, geographic location, education, wealth, religion, race, ethic group, marital status, household size, employment status, and political party affiliation.

The fingerprint database 120 stores one or more content fingerprints 232. A fingerprint 232 includes a name 234, fingerprint audio information 236 and/or fingerprint video information 238, and a list of associated files 239. The name 234 identifies the respective content fingerprint 232. For example, the name 234 could include the name of an associated television program, movie, or advertisement. In some implementations, the fingerprint audio information 236 includes a fingerprint or other compressed representation of a clip (such as several seconds, minutes, or hours) of the audio content of a video stream or an audio stream. In some implementations, the fingerprint video information 238 includes a fingerprint of a clip (such as several seconds, minutes, or hours) of a video stream. Fingerprints 232 in the fingerprint database 120 are periodically updated.

The trigger module 118 receives content information 142 from the client 102, generates a set of instructions 132 and sends a set of instructions 132 to the client 140. The trigger module 118 includes an instruction generation module 220 and a fingerprint matching module 222. In some implementations, the trigger module 118 also includes a fingerprint generation module 221, which generates fingerprints from the content information 142 or other media content saved by the server.

The fingerprint matching module 222 matches at least a portion of the content information 142 (or a fingerprint of the content information 142 generated by the fingerprint generation module) to a fingerprint 232 in the fingerprint database 120. The matched fingerprint 242 is sent to the instruction generation module 220. The fingerprint matching module 222 includes content information 142 received from the client 102. The content information 142 includes audio information 224, video information 226 and a user identifier 229. The user identifier 229 identifiers a user associated with the client 102. For example, the user identifier 229 can be an IP address associated with a client device 102 or an alphanumeric value chosen by the user or assigned by the server that uniquely identifies the user. In some implementations, the content audio information 224 includes a clip (such as several seconds, minutes, or hours) of a video stream or audio stream that was played on the client device 102. In some implementations, the content video information 226 includes a clip (such as several seconds, minutes, or hours) of a video stream that was played on the client device 102.

The instruction generation module 220 generates a set of instructions 132 based on the matched fingerprint 242. In some implementations, the instruction generation module 220 generates the set of instructions 132 based on information associated with the matched fingerprint 242 and the user data 240 corresponding to the user identifier 229. In some implementations, the instruction generation module 220 determines one or more applications 136 associated with the matched fingerprint 242 to send to the client device 140. In some implementations, the instruction generation module 220 determines one or more content files 228 based on the matched fingerprint 242 and sends the determined content files 228 to the client 140

In some implementations, the set of instructions 132 includes instructions to execute and/or display one or more applications on the client device 140. For example, when executed by the client device 140, the set of instructions 132 may cause the client device 140 to display an application that was minimized or running as a background process, or the set of instructions 132 may cause the client device 140 to execute the application. In some implementations, the set of instructions 132 include instructions that cause the client 140 to download one or more content files 228 from the server system 106.

The applications 136 include one or more applications that can be executed on the client device 140. In some implementations, the applications include a media application, a feed reader application, a browser application, an advertisement application, a coupon book application and a custom application.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., trigger module 118) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2A shows a server system, FIG. 2A is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 216 and network communication module 218) shown separately in FIG. 2A could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

Figure 2B:
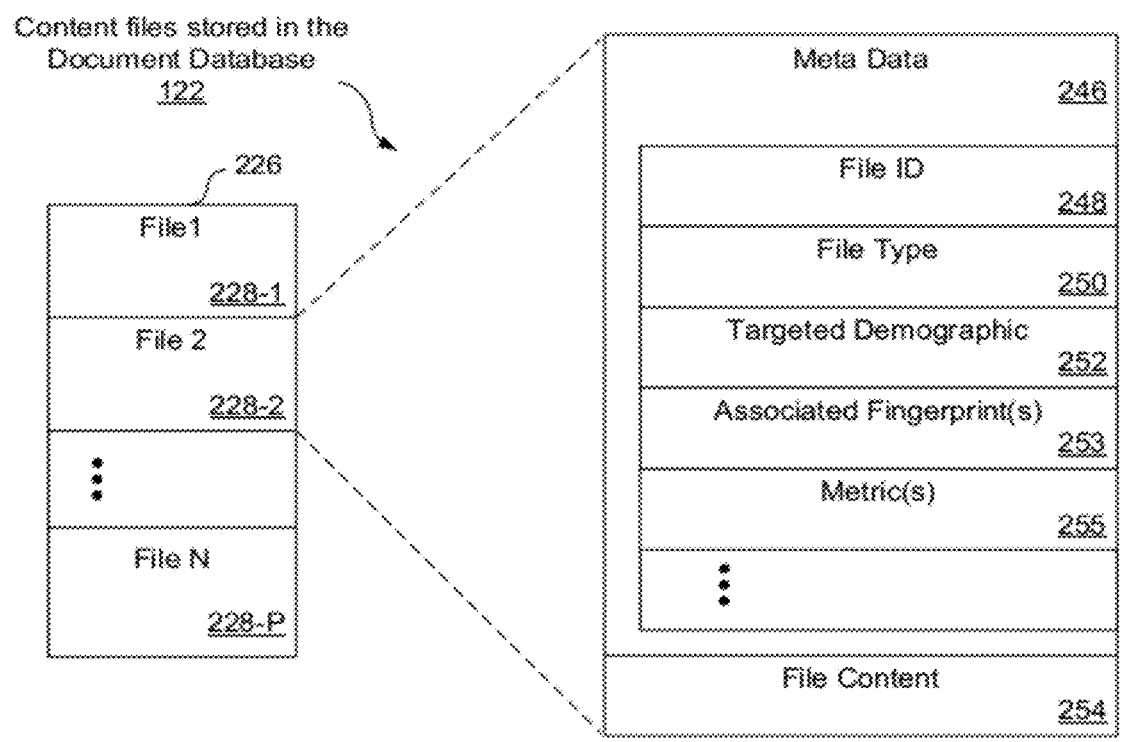
FIG. 2B illustrates an exemplary data structure according to some implementations.

FIG. 2B illustrates content file data structures 228 stored in the content database 122, according to some implementations. A respective content file 228 includes meta data 246 and content 254. The meta data 246 for a respective content file 228 includes a content file identifier (file ID) 248, a content file type 250, targeted demographic 252, one or more associated fingerprints 253, metrics 255 and optionally, additional information. In some implementations, the file ID 248 uniquely identifies a respective content file 228. In other implementations, the file ID 406 uniquely identifies a respective content file 228 in a directory (e.g., a file director) or other collection of documents within the content database 122. The file type 250 identifies the type of the content file 228. For example, the file type 250 for a respective content file 228 in the content database 122 indicates that the respective content file 228 is a video file, an image file, a music file, a web page, an email message, an SMS message, a content feed, an advertisement, a coupon, a playlist and an XML document. The associated fingerprint 253 identifies one or more fingerprints in the fingerprint database 120 that are associated with the respective content file 228. The associated fingerprints for a respective content file are determined by a broadcaster or creator of the document. The targeted demographic 252 data represents the document provider's targeted demographic for the content file 228. The target demographic data represents the population of users, with particular demographic characteristics, that the document provider wishes to target with the file. The characteristics may be one or more of: age, gender, income, geographic location, education, wealth, religion, race, ethic group, marital status, household size, employment status, and political party affiliation. The target demographic data may be represented in absolute terms (e.g., "females between 18 and 25 years in age") or, in some implementations, probabilistically (e.g., "84% male, 16% female, 5% 0-10 years old, 15% 11 to 20 years in age, 80% 20 to 45 years in age"). The metrics 255 provide a measure of the importance of a file 228. In some implementations, the metrics 255 are set by the creator or owner of the document. In some implementations, the metrics 255 represent popularity, number of views or a bid. In some implementations, multiple parties associate files with a content fingerprint and each party places a bid to have their file displayed when content corresponding to the content fingerprint is detected. In some implementations, the metrics 255 include a click throughrate. For example, a webpage may be associated with a content fingerprint.

Figure 3A:
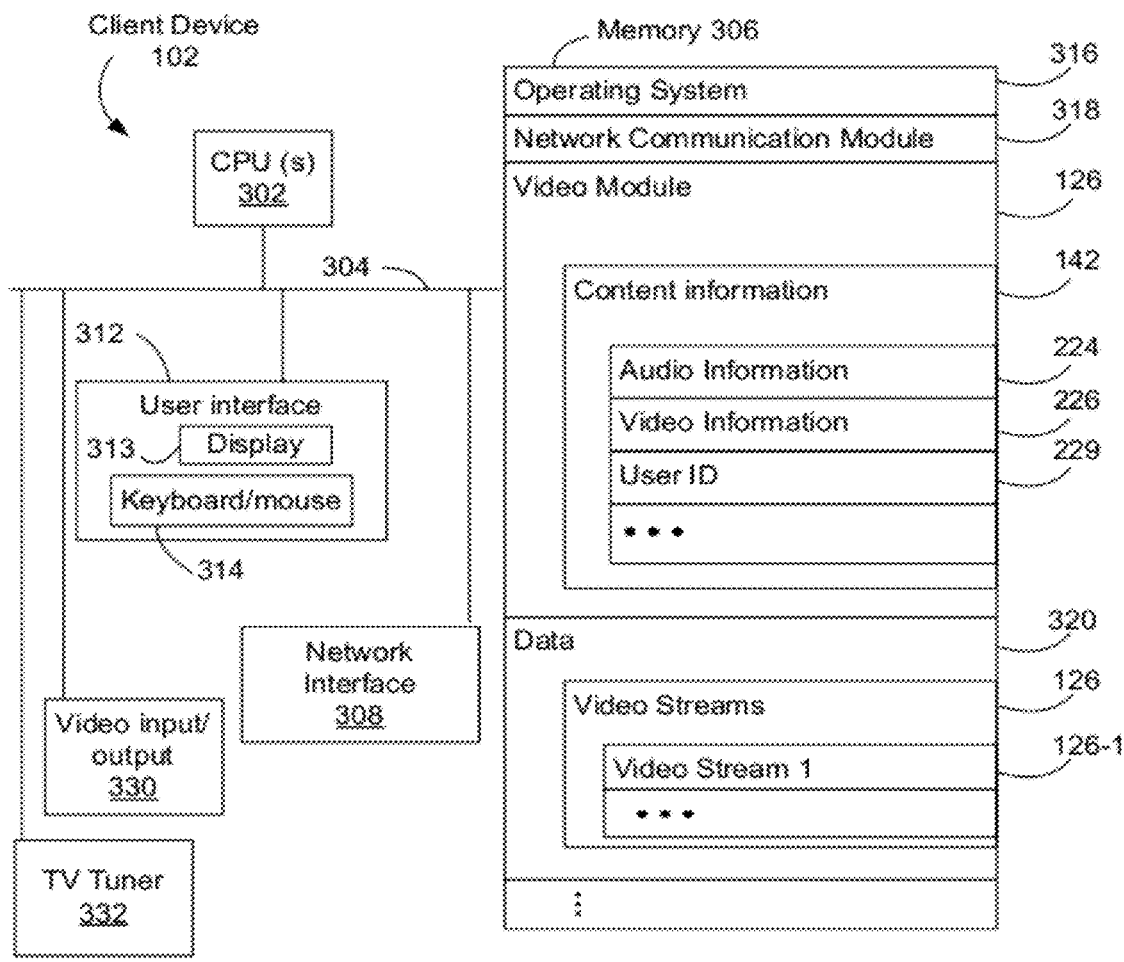
FIG. 3A is a block diagram illustrating the structure of an exemplary client device according to some implementations.

FIG. 3A is a block diagram illustrating a client device 102, in accordance with some implementations. The client device 102 typically includes one or more processing units (CPU's) 302, one or more network or other communications interfaces 308, memory 306, and one or more communication buses 304, for interconnecting these components. The communication buses 304 optionally include circuitry (sometimes called a chipset) that interconnects and controls communications between system components. The client device 102 may also include a user interface comprising a display device 313 and a keyboard and/or mouse (or other pointing device) 314. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some implementations, memory 306 or the computer readable storage medium of memory 306 store the following programs, modules and data structures, or a subset thereof including operation system 316, network communication module 318, a video module 126 and data 320.

The client device 102 includes a video input/output 330 for receiving and outputting video streams. In some implementations, the video input/output 330 is configured to receive video streams from radio transmissions, satellite transmissions and cable lines. In some implementations the video input/output 330 is connected to a set top box. In some implementations, the video input/output 330 is connected to a satellite dish. In some implementations, the video input/output 330 is connected to an antenna.

In some implementations, the client device 102 includes a television tuner 332 for receiving video streams or TV signals.

The operating system 316 includes procedures for handling various basic system services and for performing hardware dependent tasks.

The network communication module 318 facilitates communication with other devices via the one or more communication network interfaces 304 (wired or wireless) and one or more communication networks, such as the Internet, other wide area networks, local area networks, metropolitan area networks, and so on.

The data 320 includes video streams 126.

The video module 126 derives content information 142 from a video stream 126. In some implementations, the content information 142 includes audio information 224, video information 226, a user identifier 229 or any combination thereof The user identifier 229 identifies a user of the client device 102. For example, the user identifier 229 can be an IP address associated with a client device 102 or an alphanumeric value chosen by the user or assigned by the server that uniquely identifies the user. In some implementations, the audio information 224 includes a clip (such as several seconds, minutes, or hours) of a video stream or audio stream. In some implementations, the video information 226 may include a clip (such as several seconds, minutes, or hours) of a video stream. In some implementations, the video information 226 and audio information 224 are derived from a video stream 126 that is playing or was played on the client 102. The video module 126 may generate several sets of content information 142 for a respective video stream 346.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Figure 3B:
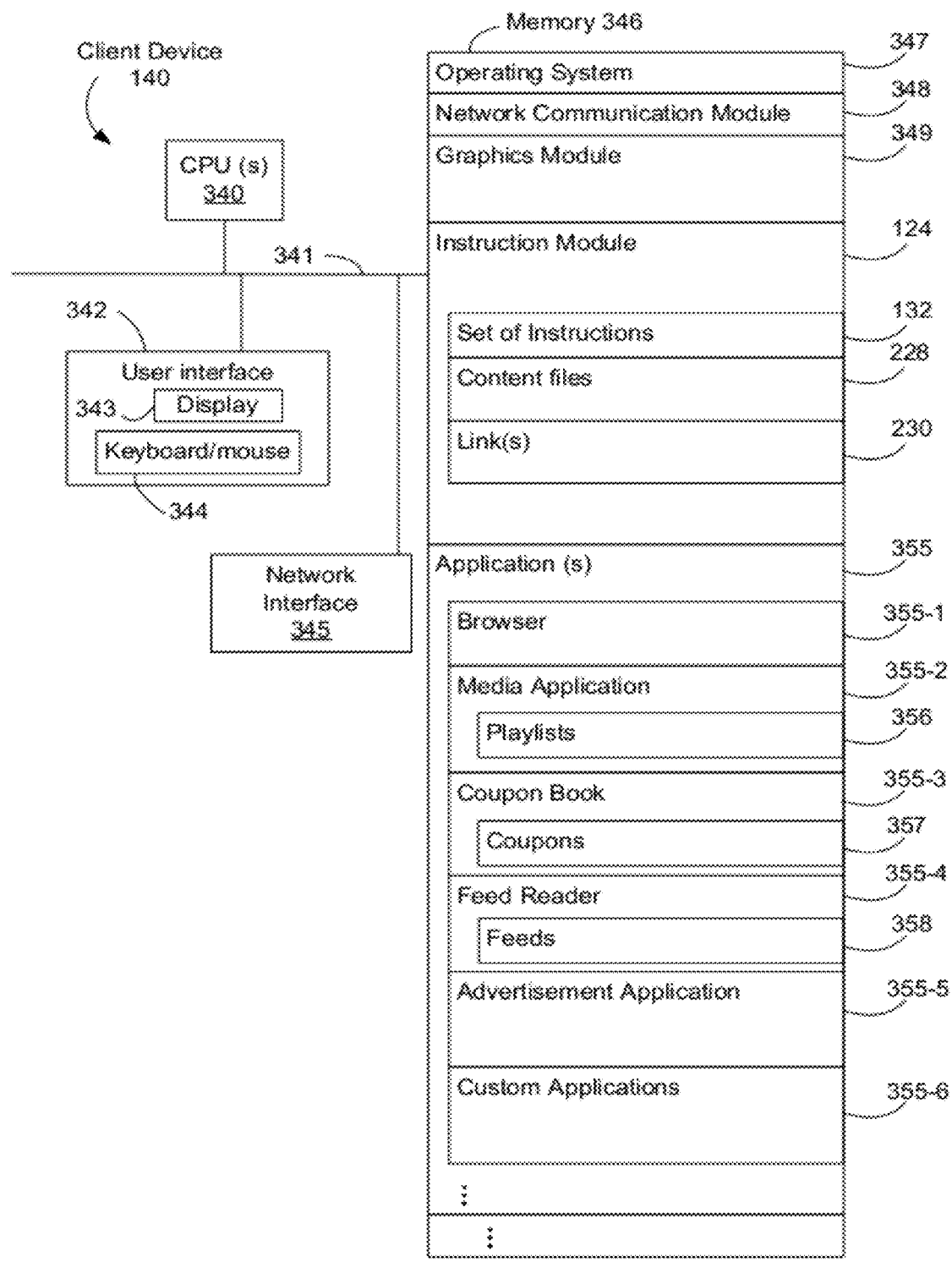
FIG. 3B is a block diagram illustrating the structure of an exemplary client device according to some implementations.

Although FIG. 3A shows a client device, FIG. 3A is intended more as functional description of the various features which may be present in a client device than as a structural schematic of the implementations described herein. In practice, and as recognized by those of ordinary skill in the art, items shown separately could be combined and some items could be separated.

FIG. 3B is a block diagram illustrating a client device 140, in accordance with some implementations. The client device 140 typically includes one or more processing units (CPU's) 340, one or more network or other communications interfaces 345, memory 346, and one or more communication buses 341, for interconnecting these components. The communication buses 341 optionally include circuitry (sometimes called a chipset) that interconnects and controls communications between system components. The client device 140 may also include a user interface comprising a display device 343 and a keyboard and/or mouse (or other pointing device) 344. Memory 346 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 346 may optionally include one or more storage devices remotely located from the CPU(s) 340. Memory 346, or alternatively the non-volatile memory device(s) within memory 346, comprises a non-transitory computer readable storage medium. In some implementations, memory 346 or the computer readable storage medium of memory 346 store the following programs, modules and data structures, or a subset thereof including operation system 347, network communication module 348, graphics module 349, a instruction module 124 and applications 355.

The operating system 347 includes procedures for handling various basic system services and for performing hardware dependent tasks.

The network communication module 348 facilitates communication with other devices via the one or more communication network interfaces 345 (wired or wireless) and one or more communication networks, such as the Internet, other wide area networks, local area networks, metropolitan area networks, and so on.

The instruction module 124 receives a set of instructions 132 and optionally content files 228 and /or links to content files 230. The instruction module 124 executes the set of instructions 132. In some implementations, the instruction module 124 executes an application 355 in accordance with the set of instructions 132. For example, in some implementations, the instruction module 124 executes a web browser 355-1 which displays a web page in accordance with the set of instructions 132. In some implementations, the instruction module 124 displays the contents of one or more content files 228. For example, in some implementations, the instruction module 124 may display an advertisement. In some implementations, the instruction module 124 retrieves one or more content files referenced in the links 230.

The client device 140 includes one or more applications 355. In some implementations, the applications 355 include a browser application 355-1, a media application 355-2, a coupon book application 355-3, a feed reader application 355-4, an advertisement application 355-5 and custom applications 355-6. The browser application 355-1 displays web pages. The media application 355-2 plays videos and music, displays images and manages playlists 356. The feed reader application 355-4 displays content feeds 358. The coupon book application 355-3 stores and retrieves coupons 357. The advertisement application 355-5 displays advertisements. The custom applications 355-6 display information from a website in a format that is easily viewable on a mobile device. The applications 328 are not limited to the applications discussed above.

Each of the above identified elements may be stored in one or more of the previously mentioned memory devices, and each of the modules or programs corresponds to a set of instructions for performing a function described above. The set of instructions can be executed by one or more processors (e.g., the CPUs 340). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3B shows a client device, FIG. 3B is intended more as functional description of the various features which may be present in a client device than as a structural schematic of the implementations described herein. In practice, and as recognized by those of ordinary skill in the art, items shown separately could be combined and some items could be separated.

Figure 4:
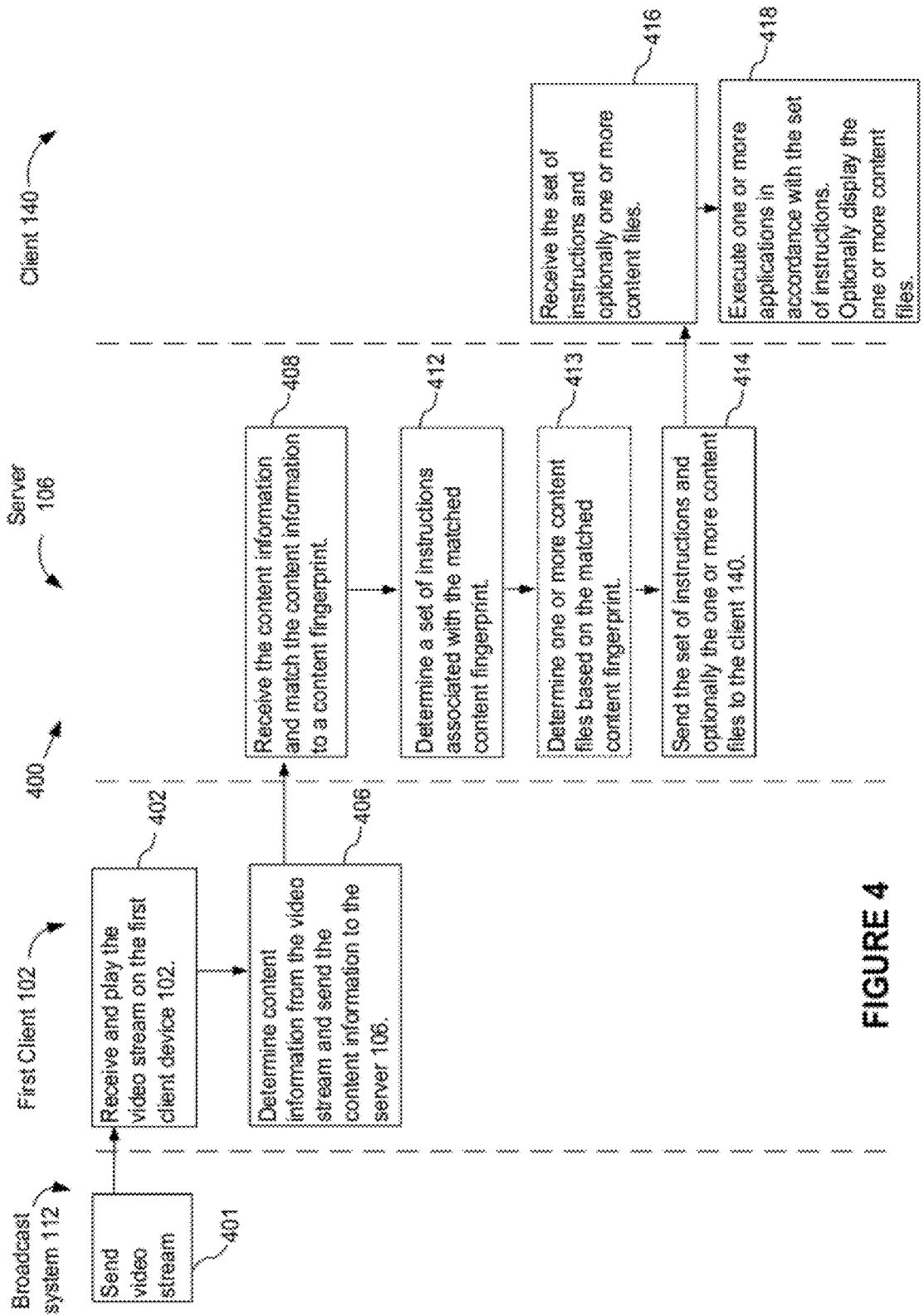
FIG. 4 is a flowchart illustrating an overview of the process of displaying content on a second device that is related to the content playing on a first device.

FIG. 4 is a flow diagram illustrating a process 400 of displaying content on a second device that is related to the content played on a first device, according to some implementations. FIG. 4 provides an overall view of a method 600 which is discussed in more detail in the discussion of in FIGS. 6A and 6B. A broadcast system 112 sends a video stream to a client 102 (401). The video stream is received and displayed by the client device 102 (402). While the video stream is played, content information from the video stream is determined and sent to a server 106 (406). As described elsewhere in this application, in some implementations the content information from the video stream includes one or more clips (such as several seconds, minutes or hours) of audio and/or video components of the video stream, or fingerprints or other signatures generated by the client device 102 from one or more clips of the audio and/or video components of the video stream. In some implementations, the content information is formatted so it can be readily compared to content triggers stored on the server. The server 106 receives the content information and matches the content information to a content fingerprint/trigger (408).

In some implementations, the content fingerprints/triggers are generated by the server (e.g., using the fingerprint generation module 121) prior to run time from media content (e.g., audio and/or video clips, or video frames) uploaded by a third party user. In some implementations, the third party user specifies and/or uploads to the server 106 associated executable instructions and/or content items that the third party user intends to be downloaded to any client device 102 (or, in some implementations, a client device 102 with particular device and/or user characteristics) when the server 106 receives matching content information from a client device 102 (i.e., when a client device 102 is processing/displaying a video stream that includes the associated content trigger).

A set of instructions (e.g., applications that can be executed on the client device 140) associated (e.g., by a third party user) with the matched fingerprint/trigger is determined (412). In some implementations, one or more content files (e.g., media content, ads, or are determined based on the matched content fingerprint (413). The set of instructions and, optionally, the one or more content files are sent to the client 140. In some implementations, the set of instructions 132 and the one or more content files can be sent to the client 140 directly, via the client's connection to the communications network 104, or indirectly, via the connection 103 between the client 10 and the client 102. The client device 140 receives the set of instructions and, optionally, the one or more content files (416). One or more applications are executed on the client device 140 in accordance with the set of instructions (418). In some implementations, the one or more content files are displayed on the display device 128 associated with the client device 140 in coordination in time with the video stream 126 being displayed by the client 102. In this way, a third party, such as an advertiser, broadcaster or content originator, is able to specify secondary content (e.g., content files or applications) that are displayed to the user and/or executed on a secondary display device 128 while the user is viewing primary media content on a primary display device 108—at a particular viewing point in the primary content that is associated with a content trigger designated by the third party.

FIGS. 5A, 5B, 5C and 5D illustrate exemplary screen shots according to some implementations. FIGS. 5A, 5B, 5C and 5D each illustrate screen shots of a first client 102 and a second client 140. The first client 102 plays video content, while the second client 140 displays content related to the video content playing on the first client 102. The illustrations in FIGS. 5A, 5B, 5C, 5D and 5E should be viewed as exemplary but not restrictive in nature. In some implementations, the exemplary screen shots are generated by instructions/applications downloaded to the second client device 140 by the server 106 in response to the server 106 matching client fingerprints to content fingerprints stored on the server. In some implementations, the exemplary screen shots are generated by instructions/applications that are stored on the second client device 140 (such as a browser or other pre-configured application) in response to an instruction from the server 106 to display a particular content item in response to the server 106 matching client fingerprints to content fingerprints stored on the server.

Figure 5A:
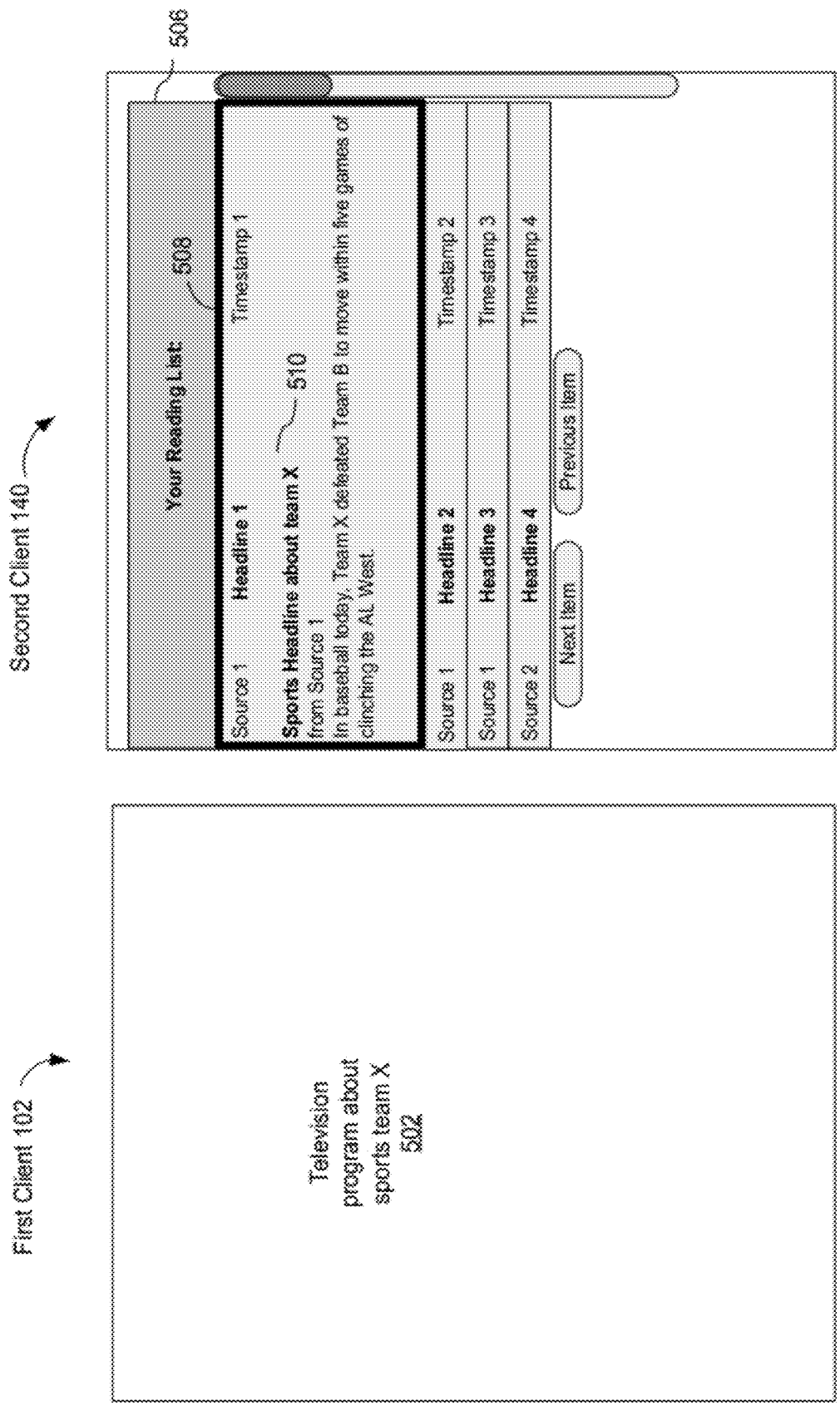
FIGS. 5A, 5B, 5C and 5D are an exemplary screenshot according to some implementations.

FIG. 5A illustrates screenshots of the first client device 102 and the second client device 140. The first client 102 displays a television program 502 and the second client 140 displays a feeder reader application 506, a content feed 508 and a content feed item 510 related to the television program 502. While the television program 502 is played on the first client 102, the first client 102 sends content information derived from the television program 502 to the server system 106. The server system 106 matches the content information to a content fingerprint in order to identify the television program 502. After identifying a content fingerprint that matches the content information, the server 106 generates a set of instructions that includes instructions to display content related to the television program 502 and sends the set of instructions to the second client device 140 for execution. The second client device 140 executes the set of instructions which includes executing or invoking the feed reader application 506 and retrieving a content item 510 that is related to the television program 502. When executed, the feed reader application 506 displays a content feed 508 that includes one or more content items 510 that are related to the television program 502. For example, the television program 502 may be about sports team X and the content feed 508 includes a content item 510 related to sports team X. The feed reader application 506 is executed or invoked on the client device 140 while the television program 502 is played on the client device 102.

Figure 5B:
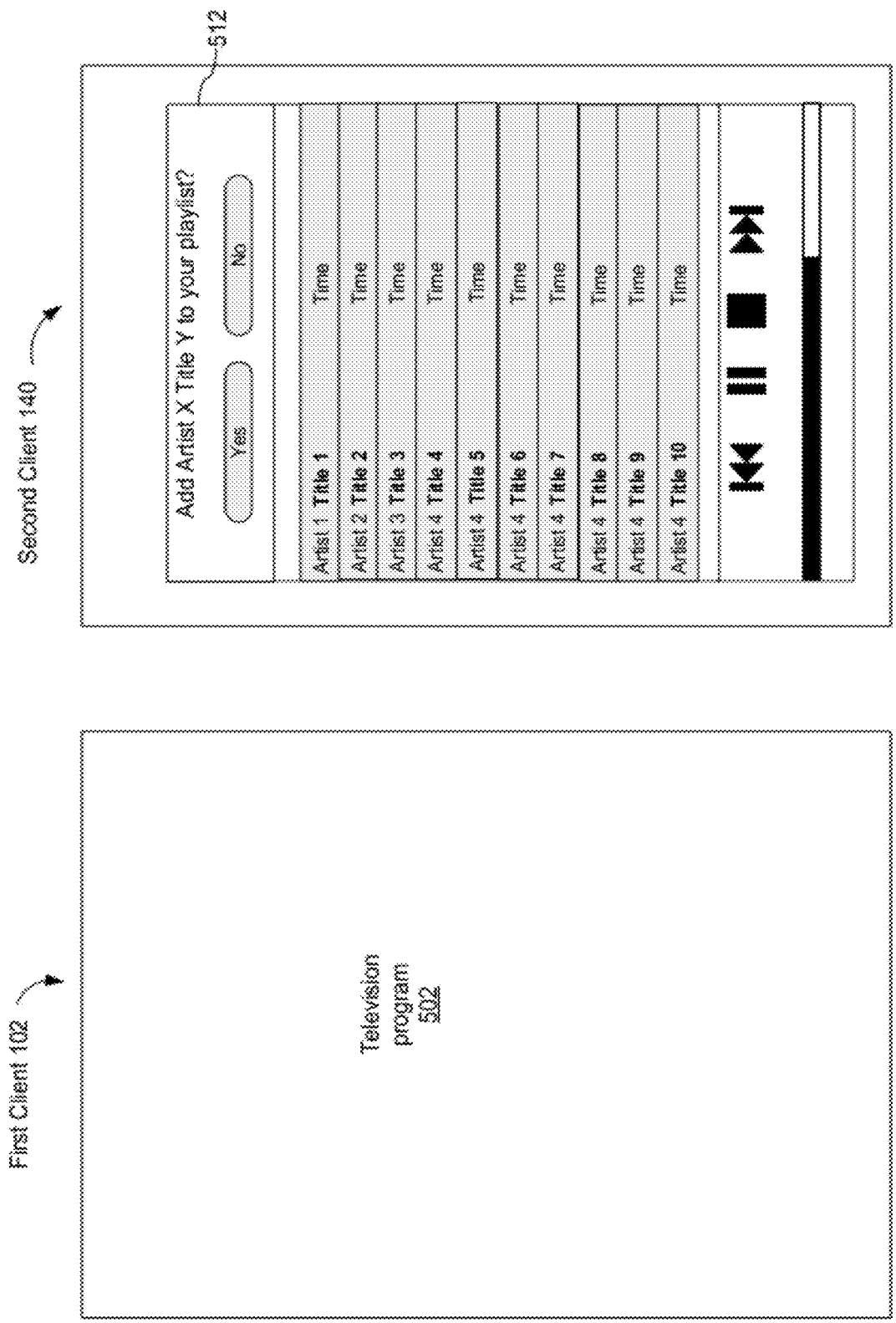

In FIG. 5B, the first client 102 displays a television program 502 and the second client 140 display a media application 512. The media application 512 performs a function when the television program 502 is recognized. For example, when the television program 502 on the first client 102 indicates a particular song, the media application 512 on the second client 140 prompts a user to add the song to the user's playlist. The media application 512 is executed or invoked on the client device 140 while the television program 502 is played on the client device 102.

Figure 5C:
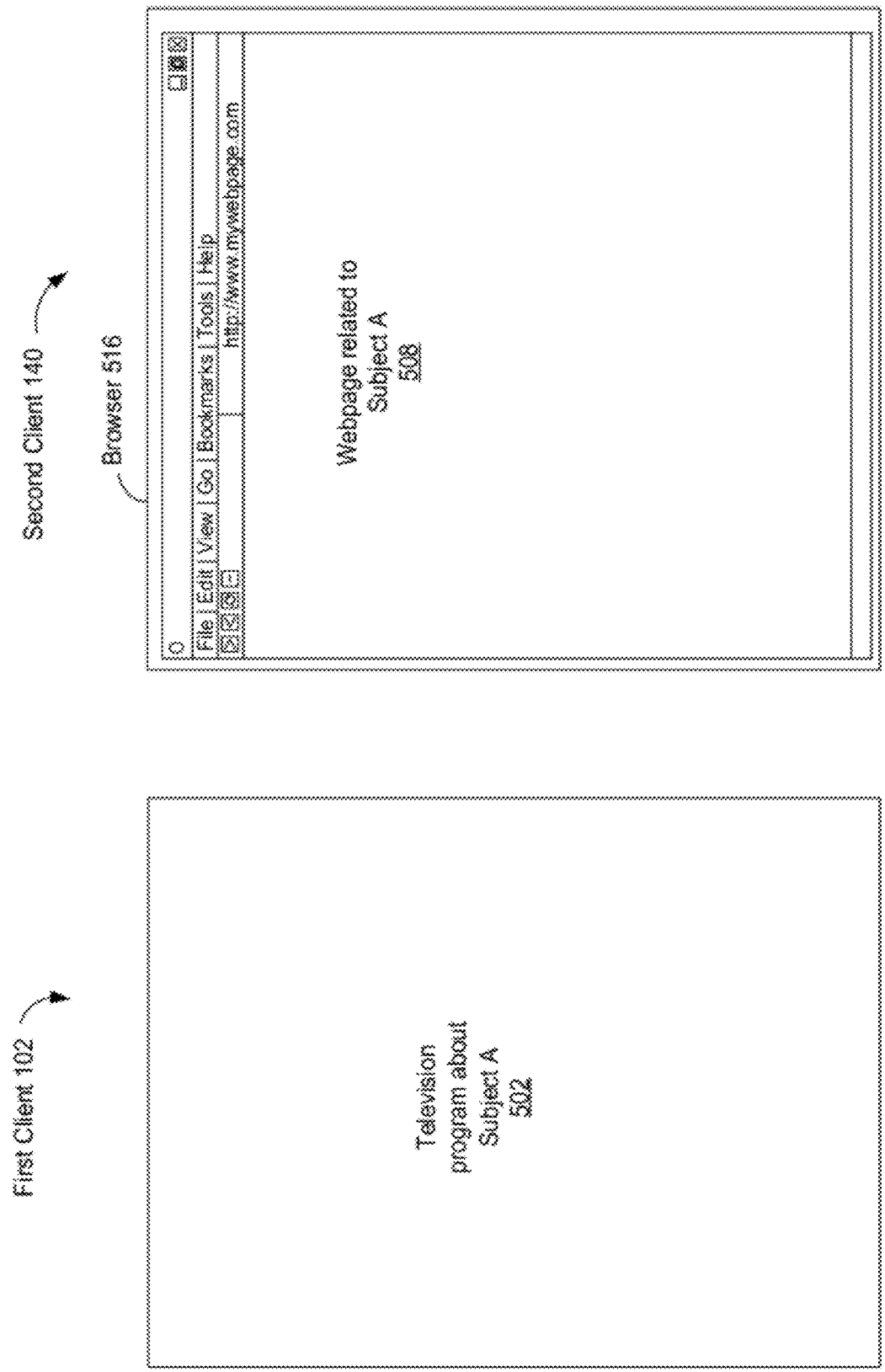

In FIG. 5C, the first client 102 displays a television program 502 and the second client 140 display a web browser 516 and a web page 508. The web page 508 includes content relating to the television program 502. For example, the television program 502 may indicate pizza and the web page 508 may display an advertisement for pizza. The web browser 516 is executed or invoked on the client device 140 while the television program 502 is played on the client device 102.

Figure 5D:
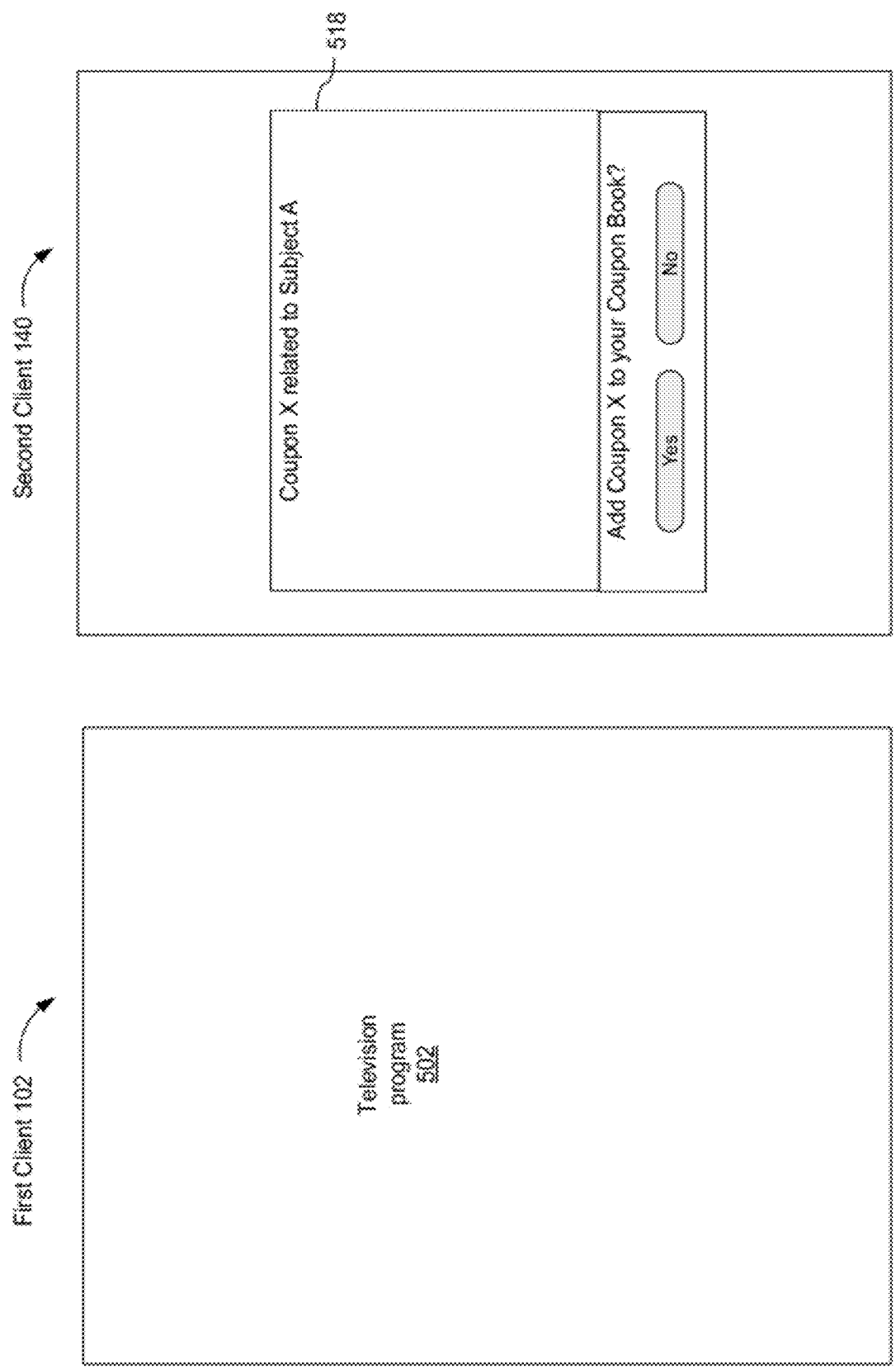

In FIG. 5D, the first client 102 displays a television program 502 and the second client 140 displays a coupon application 518. The coupon application 518 displays coupons related to the television program 502. For example, the television program 402 may include a pizza commercial and the coupon application 518 may display a coupon for pizza. The coupon application 518 is executed or invoked on the second client device 140 while the television program 502 is played on the first client device 102.

Figure 6A:
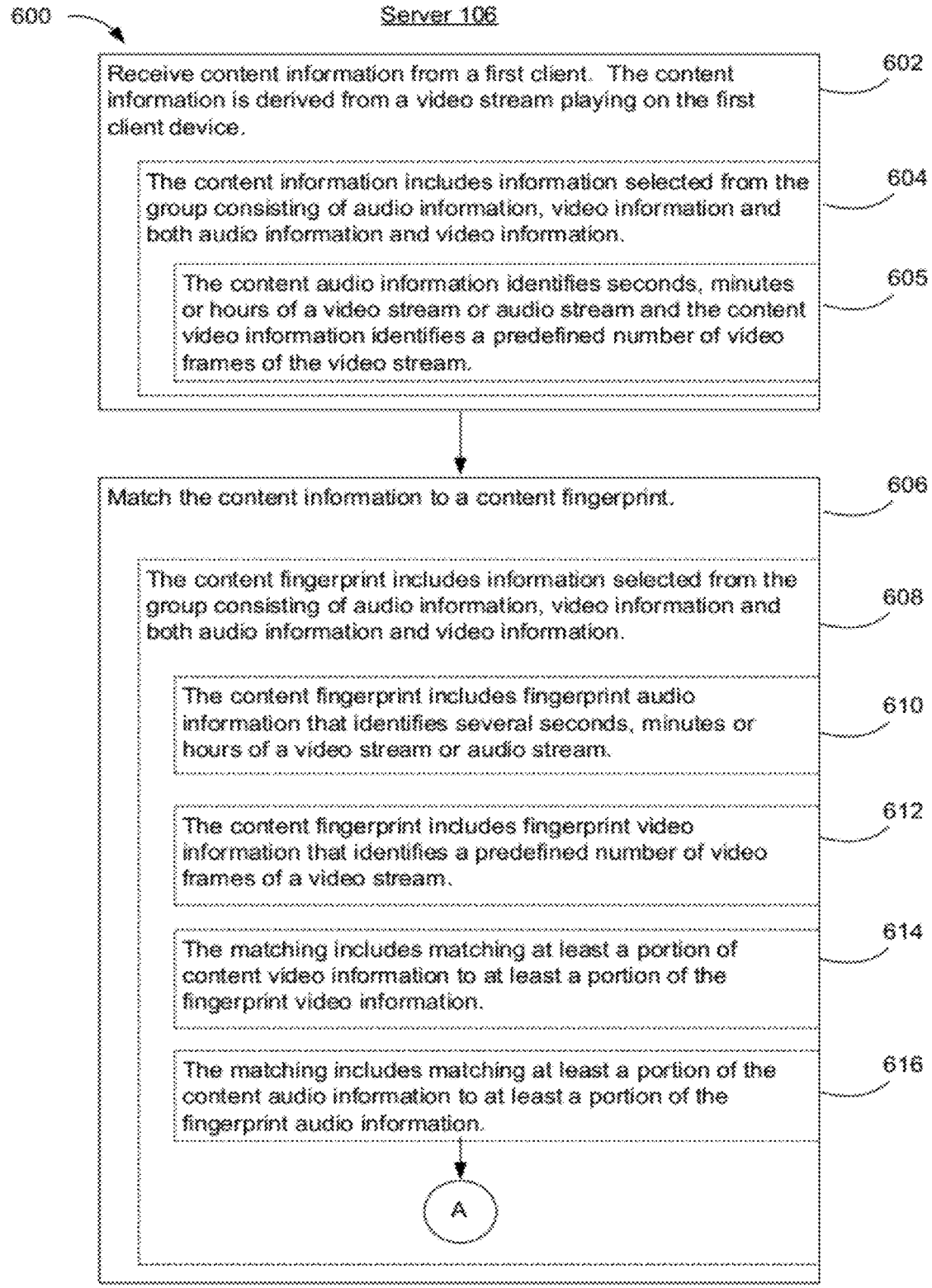
FIGS. 6A and 6B are flowcharts illustrating the processing of identifying content displayed on a first client device and determining a set of instructions to display related content on a second client.
Figure 6B:
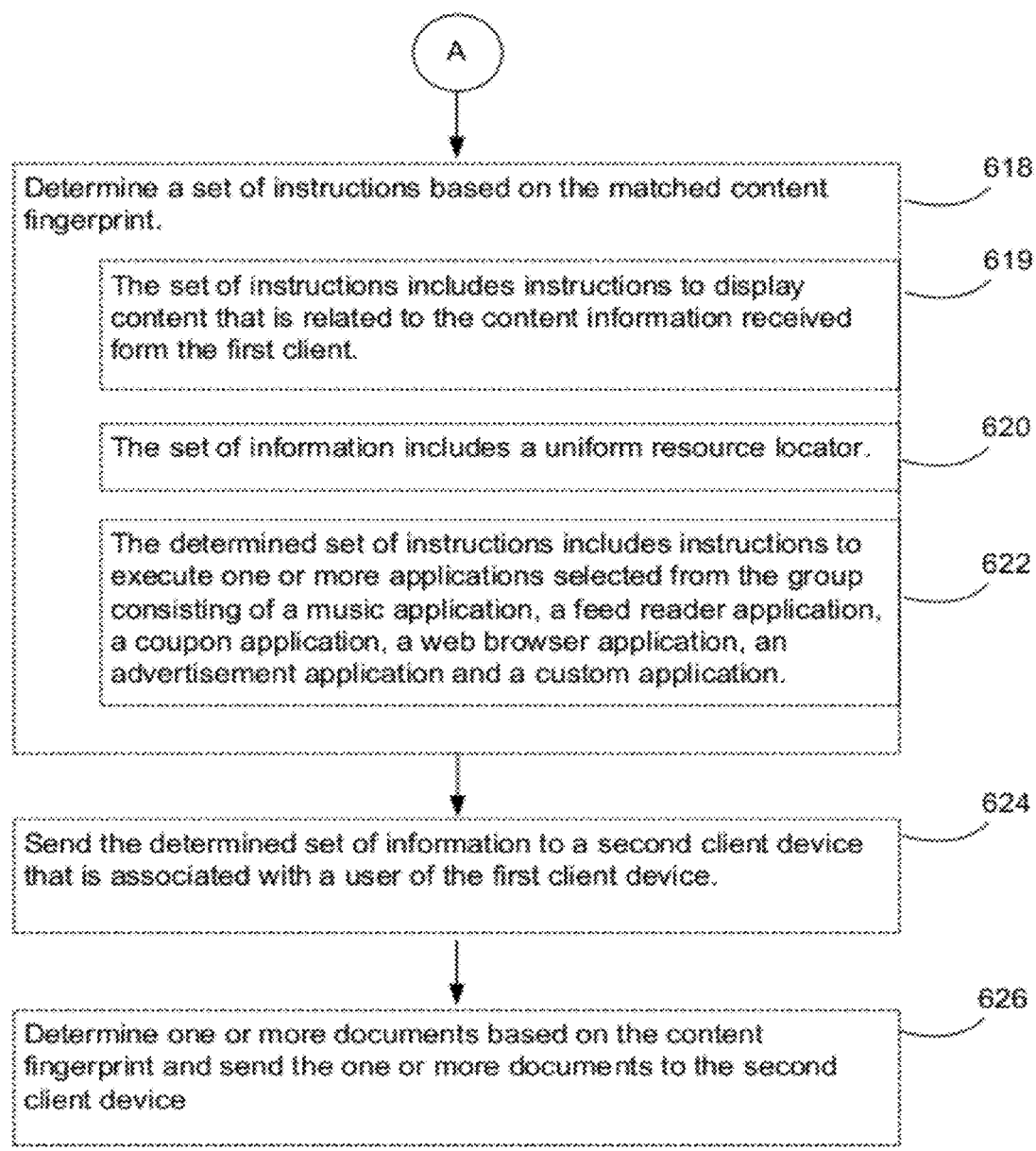

FIGS. 6A and 6B illustrate a method 600 for displaying information on a second client device that is related to content played on a first client device. Such method provides an effective way for broadcasters and content providers to provide information relevant to video content while the video content is being played.

The method 600 is performed at a server system 106 having one or more processors and memory. Content information 142 is received by the server system 106 (602). The content information is derived from a video stream playing on a first client device 102 (602). For example, the video stream may correspond to a television program, commercial or a movie playing on the first client device 102. In some implementations, the content information 142 is derived from an audio stream. For example, the content information 142 may be derived from a song playing on the first client device 102. In some implementations, the content information 142 is a video stream or an audio stream. In some implementations, the content information 142 includes information selected from the group consisting of content audio information 224, content video information 226 or both content audio information 224 and content video information 226 (604). In some implementations, the content audio information 224 includes a clip (such as several seconds, minutes, or hours) of a video stream or audio stream (605). In some implementations, the content video information 226 includes a clip (such as several seconds, minutes, or hours) of a video stream (605). In some implementations, the content video information 226 includes a predefined number of consecutive video frames of a video stream. In some implementations, the front end server 114 of the server system 106 receives the content information 142 and sends the content information 142 to the trigger module 118. In some implementations, the content information 142 is received from the client device 102. In some implementations, the content information 142 includes a user identifier 229 for a user associated with the first client device 102.

The content information 142 is matched to a content fingerprint 232 (606). The fingerprint matching module 222 of the trigger module 118 matches the content information 142 to a content fingerprint 232 stored in the fingerprint database 120. By matching the content information 142 to a content fingerprint 232, the server 106 identifies the video stream or audio stream playing on the first client 102. For example, by matching the content information 142 to a content fingerprint 232, the server 106 is able to recognize that a particular television show, commercial, song or movie is playing on the first client 102. In some implementations, the content fingerprint 232 includes information selected from the group consisting of fingerprint audio information 236, fingerprint video information 238 and both fingerprint audio information 236 and fingerprint video information 238 (608). In some implementations, the content fingerprint 232 includes fingerprint audio information 236 that identifies a clip (such as several seconds, minutes or hours) of a video stream or audio stream (610). In some implementations, the content fingerprint 232 includes fingerprint video information 238 that identifies a predefined number of video frames of a video stream (612). In some implementations, the content fingerprint 232 includes fingerprint video information 238 that identifies a clip (such as several seconds, minutes or hours) of a video stream. In some implementations, the matching includes matching at least a portion of content video information 226 to at least a portion of fingerprint video information 238 (614). In some implementations, the matching includes matching at least a portion of the content audio information 224 to at least a portion of the fingerprint audio information 236 (616). In some implementations, the matching includes both matching content video information 226 to fingerprint video information 238 and content audio information 224.

A set of instructions 132 is determined based on the matched content fingerprint 242 (618). After identifying a matched fingerprint 242, the instruction generation module 220 generates a set of instructions 132 to be executed at the second client 140. The second client device 140, for example, may be a mobile device or tablet device. The set of instructions 132 is determined based on information associated with the matched fingerprint 242. In some implementations, the matched fingerprint 242 includes a list of associated documents 239 that are stored in the content database 122 that include content related to the content corresponding to the matched fingerprint 242. A content provider or broadcaster may associate files to a content fingerprint in order to have the files displayed when the content matching the content fingerprint is detected. For example, the content owner of a television program may associate a webpage having information about a television program to a content fingerprint corresponding to the television program. When content information corresponding to the television program is received and matched to the corresponding content fingerprint, the instruction generation module 220 generates a set of instructions 132 to display the webpage showing information about the television program.

In some implementations, the determining includes determining one or more content files based on the matched content fingerprint (626). The one or more content files include information related to the content corresponding to the matched content fingerprint. The matched content fingerprint includes a list of associated files 239. The instruction module 220 selects at least a subset of the one or more files specified by the list of associated files 239. In some implementations, the instruction generation module 220 selects a subset of the content files associated with the matched fingerprint 242 based on the metrics 255 associated with the files. For example, the instruction module 220 may select the files with the highest popularity, click-through rate, bid or number of views.

In some implementations, the instruction generation module 220 selects one or more of the content files associated with a matched fingerprint 242 based on the target demographics of the one or more content files and the demographic information 244 of the user corresponding to the user identifier 229 contained in the content information 142. In some implementations, the content files having target demographics 252 that mach the user's demographic information 244 are selected. For example, a respective file is chosen for a respective user if the target demographic of the respective content file 228 is males ages 18-25 located in California and the respective user is a 23 year old male in California.

In some implementations, the set of instructions 132 includes instructions to display content that is related to the content information received from the first client (619). For example, the instructions 132 may include instructions to display an advertisement related to a television program played on the first client device. In some implementations, the instruction generation module 220 generates a set of instructions 132 to display information from the files associated with the matched fingerprint 242. For example, the instructions 132 may include instructions to display the name of a song file. In some implementations, the set of instructions 132 include instructions to display one or more content files associated with the matched fingerprint 242. For example, the instructions 132 may include instructions to display a web page. In some implementations, the set of instructions 132 include instructions to play one or more content files associated with the matched fingerprint 242. For example, the instructions 132 may include instruction to play a song or video. In some implementations, the set of instructions 132 includes instructions to download one or more content files.

In some implementations, the set of instructions 132 includes a uniform resource locator (620). In some implementations, the set of instructions 132 includes instructions to download a document specified in a uniform resource locator. The uniform resource locator may link to a content file stored in the content database 122.

In some implementations, the determined set of instructions 132 includes instructions to execute one or more applications selected from the group consisting of a music application, a feed reader application, a browser application, a coupon application, an advertisement application and a custom application (622). In some implementations, the set of instructions 132 brings into view one or more applications that are running on a client device 140 but are not currently being displayed. In some implementations, the set of instructions 132 includes instructions to download and execute an application 136 from the server 106. In some implementations, the determined set of instructions 132 includes instructions to display or play one or more content files using one or more applications.

The set of instructions 132 is sent to a second client device 140 that is associated with a user of the first client device 102 (624). For example, the second client device 140 may be a tablet device and the first client device may be a television. After the set of instructions 232 is generated, the front end server 114 sends the set of instructions 232 to the client device 140 for execution. In some implementations, the one or more determined content files are sent to the second client device 140 (626). In some implementations, one or more applications are sent to the second client device 140.

FIG. 7 illustrates a method 700 for displaying information on a second client device that is related to content playing on a first client device. The method 700 is performed at a second client device 140 having one or more processors and memory. A set of instructions 132 is received at the second client device (702). The set of instructions 132 includes instructions to display content that is related to content playing on a first client device 102 (702). For example, the set of instructions 132 may include instructions to display a web page containing information about a movie playing on the first client device 102. In some implementations, the set of instructions 132 include instructions to retrieve one or more content files from a server 106 remotely located from the second client 140 (704). In some implementations, the one or more content files 228 are retrieved from a server (e.g, server 106) remotely located from the second client 140 (706). The one or more content files include content files stored in the content database 122 that are related to the content playing on the first client device 102. For example, the first client device may display a commercial for pizza and the one or more content files may include coupons for pizza. In some implementations one or more content files 228 are received with the set of instructions 132. In some implementations, the set of instructions 132 include instructions to retrieve one or more applications from a server 106 remotely located from the second client 140.

One or more applications are executed in accordance with the set of instructions 132 (708). The one or more applications display the content that is related to content playing on the first client device (708). For example, a web browser may display a web page containing information about a television program playing on the first client device or a feed reader application may display articles relating to the television program playing on the first device. Any application compatible with the set of instructions 132 may be executed. In some implementations, the set of instructions 132 include instructions to execute one or more applications selected from the group consisting of a media application, a feed reader application, a web browser application, a coupon book, an advertisement application and a custom application (710). In some implementations, the executing includes displaying information from one or more content files (712). For example, a web browser may display a web page or a media application may display the title and artist for a song file. The one or more applications are executed by the instruction module 124.

Each of the methods described herein may be governed by instructions that are stored in a non-transitory computer readable storage medium and that are executed by one or more processors of one or more servers (e.g., server system 106). Each of the operations shown in FIGS. 6A, 6B and 7 may correspond to instructions stored in a computer memory or computer readable storage medium.

The foregoing description, for purpose of explanation, has been described with reference to specific implementations. However, the illustrative discussions above are not intended to be exhaustive or to limit the methods and systems to the precise forms disclosed. Many modifications and variations are possible in view of the above teachings. The implementations were chosen and described in order to best explain the principles of the methods and systems and their practical applications, to thereby enable others skilled in the art to best utilize the various implementations with various modifications as are suited to the particular use contemplated.

Moreover, in the foregoing description, numerous specific details are set forth to provide a thorough understanding of the present implementation. However, it will be apparent to one of ordinary skill in the art that the methods described herein may be practiced without these particular details. In other instances, methods, procedures, components, and networks that are well known to those of ordinary skill in the art are not described in detail to avoid obscuring aspects of the present implementation.

What is claimed is:

1. A method, comprising:
   at a computing system having one or more processors and memory storing one or more programs to be executed by the one or more processors:
   obtaining content information derived from a first media content item being displayed on a first electronic device;
   in accordance with a match between the content information and a content fingerprint;
   determining a set of instructions for displaying a second media content item based on the matched content fingerprint; and
   causing the second media content item to be displayed on a second electronic device concurrently with display of the first media content item on the first electronic device, by:
   causing the determined set of instructions to be executed by the second electronic device.

2. The method of claim 1, wherein the content information includes at least one of content audio information, content video information, and both content audio information and content video information.

3. The method of claim 2, wherein the content audio information identifies a clip of a video stream or audio stream and wherein the content video information identifies a predefined number of video frames of the video stream.

4. The method of claim 1, wherein the content fingerprint includes at least one of fingerprint audio information, fingerprint video information and both fingerprint audio information and fingerprint video information.

5. The method of claim 1, wherein the content fingerprint includes fingerprint audio information that identifies a clip of a video stream or audio stream.

6. The method of claim 1, wherein the content fingerprint includes fingerprint video information that identifies a predefined number of video frames of a video stream.

7. The method of claim 1, wherein the match between the content information and the content fingerprint includes a match between at least a portion of the content audio information and at least a portion of the fingerprint audio information.

8. The method of claim 1, wherein match between the content information and the content fingerprint includes a match between at least a portion of the content video information and at least a portion of the fingerprint video information.

9. The method of claim 1, wherein the determined set of instructions includes instructions to display content that is related to the content information received from the first electronic device.

10. The method of claim 1, wherein an item in the set of instructions includes a uniform resource locator.

11. The method of claim 1, wherein the determined set of instructions includes instructions to execute one or more applications that include at least one of a music application, a feed reader application, a coupon application, an advertisement application and a web browser application.

12. The method of claim 1, further comprising;
   determining one or more content files based on the content information; and
   making the one or more content files available to the second electronic device.

13. The method of claim 1, wherein the computing system is the second electronic device.

14. The method of claim 1, wherein the computing system is distinct from the second electronic device.

15. The method of claim 1, wherein the first electronic device is without access to the Internet.

16. The method of claim 1, wherein the second electronic device is a mobile electronic device, and the first electronic device is a television or computer display.

17. The method of claim 1, wherein the first media content item and the second media content item are different media content items.

18. The method of claim 1, wherein the second media content item includes an advertisement related to the first media content item.

* * * * *